United States Patent
Feigenblum et al.

(10) Patent No.: US 10,173,379 B2
(45) Date of Patent: Jan. 8, 2019

(54) DEVICE FOR HEATING A MOLD

(71) Applicant: ROCTOOL, Le Bourget du Lac (FR)

(72) Inventors: José Feigenblum, Saint Paul (FR); Julien Fritsch, Chambéry (FR)

(73) Assignee: ROCTOOL, Le Bourget du Lac (FR)

( * ) Notice: Subject to any disclaimer, the term of this patent is extended or adjusted under 35 U.S.C. 154(b) by 156 days.

(21) Appl. No.: 15/302,542

(22) PCT Filed: Apr. 13, 2015

(86) PCT No.: PCT/EP2015/057993
§ 371 (c)(1),
(2) Date: Nov. 19, 2016

(87) PCT Pub. No.: WO2015/155369
PCT Pub. Date: Oct. 15, 2015

(65) Prior Publication Data
US 2017/0095986 A1 Apr. 6, 2017

(30) Foreign Application Priority Data
Apr. 11, 2014 (FR) ..................................... 14 53285

(51) Int. Cl.
*B29C 35/08* (2006.01)
*B29C 33/38* (2006.01)
(Continued)

(52) U.S. Cl.
CPC ............ *B29C 70/443* (2013.01); *B29C 33/04* (2013.01); *B29C 33/06* (2013.01); *B29C 33/3842* (2013.01); *B29C 35/0805* (2013.01); *B29C 70/44* (2013.01); *B29C 33/0011* (2013.01); *B29C 33/307* (2013.01); *B29C 70/42* (2013.01); *B29C 2035/0811* (2013.01); *B29C 2035/0816* (2013.01); *B29K 2905/00* (2013.01); *B29K 2909/02* (2013.01); *B29K 2909/06* (2013.01); *B29K 2995/0008* (2013.01)

(58) Field of Classification Search
CPC ......... B29C 35/0805; B29C 2035/0811; B29C 2035/0816; B29C 33/3842; B29C 70/443; B29C 70/44; B33Y 80/00
See application file for complete search history.

(56) References Cited

U.S. PATENT DOCUMENTS 2,783,348 A * 2/1957 Warren .................... H05B 6/62
219/778
6,091,063 A 7/2000 Woods
(Continued)

FOREIGN PATENT DOCUMENTS

EP 1 894 442 A1 3/2008
EP 1 728 411 B1 2/2010
(Continued)

*Primary Examiner* — Robert B Davis
(74) *Attorney, Agent, or Firm* — IM IP Law; C. Andrew Im; Chai Im

(57) ABSTRACT

A heating device to heat a molding face, particularly a large molding face. The heating device includes a metal sheet having a ferromagnetic layer, and a part formed into a shape that defines the molding face and a forming plane. A base of the heating device supports the metal sheet. An inductor of the heating device provides the induction heating of the metal sheet.

34 Claims, 5 Drawing Sheets

(51) Int. Cl.
  *B29C 70/44*    (2006.01)
  *B33Y 80/00*    (2015.01)
  *B29C 33/06*    (2006.01)
  *B29C 33/04*    (2006.01)
  B29C 33/00    (2006.01)
  B29C 33/30    (2006.01)
  B29C 70/42    (2006.01)

(56) References Cited

U.S. PATENT DOCUMENTS

| | | |
|---|---|---|
| 7,679,036 B2 | 3/2010 | Feigenblum et al. |
| 8,021,135 B2 * | 9/2011 | Anbarasu ................ B29C 33/06 219/600 |
| 8,108,982 B2 * | 2/2012 | Manuel ................... B29C 33/04 164/348 |
| 9,248,598 B2 * | 2/2016 | Guichard ................ H05B 6/42 |
| 2004/0058027 A1 | 3/2004 | Guichard et al. |
| 2010/0201040 A1 | 8/2010 | Guichard et al. |
| 2011/0156304 A1 * | 6/2011 | Walker ................... B23P 15/24 264/219 |
| 2015/0000108 A1 | 1/2015 | Hascoet et al. |
| 2015/0202800 A1 * | 7/2015 | Luquain ................. B29C 70/34 156/245 |

FOREIGN PATENT DOCUMENTS

| | | | |
|---|---|---|---|
| EP | 2 508 329 A1 | 10/2012 | |
| FR | 2 816 237 A1 | 5/2002 | |
| FR | 3015918 A1 * | 7/2015 | ......... B29C 35/0805 |
| WO | 98/00274 A1 | 1/1998 | |
| WO | 2013/079725 A1 | 6/2013 | |

\* cited by examiner

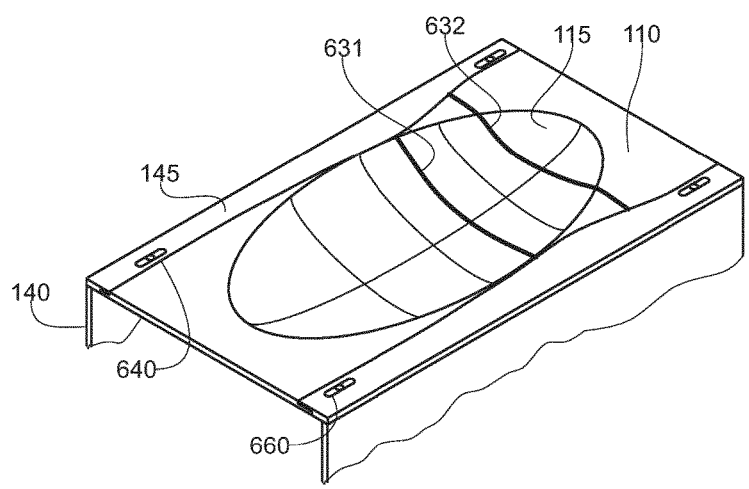
Fig. 6
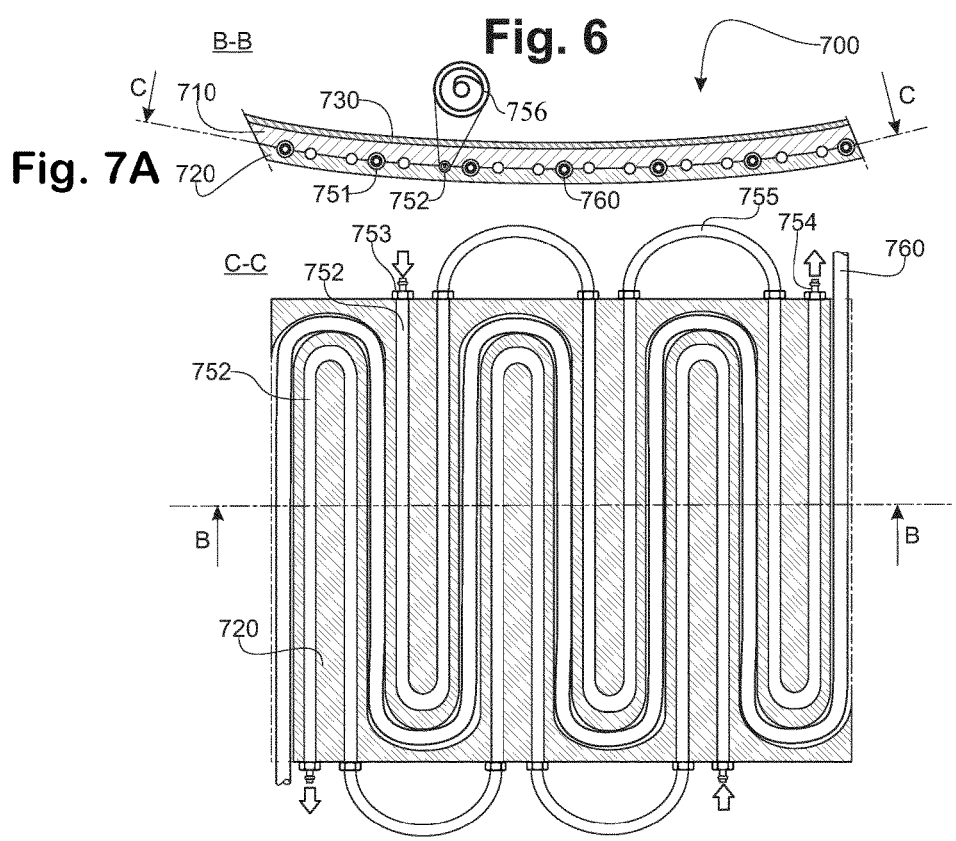
Fig. 7A
Fig. 7B

DEVICE FOR HEATING A MOLD

RELATED APPLICATIONS

This application is a § 371 application from PCT/EP2015/057993 filed Apr. 13, 2015, which claims priority from French Patent Application No. 14 53285 filed Apr. 11, 2014, each of which is herein incorporated by reference in its entirety.

FIELD OF THE INVENTION

The invention relates to a device for heating a mold. The invention is particularly but not exclusively suitable for making a large mold designed for molding composite materials using a method known an as out-of-autoclave method.

BACKGROUND OF THE INVENTION

The molding of a composite material with a thermoplastic or thermosetting matrix from prepreg plies requires an operation to cure/consolidate the preform made up of the layered structure of said plies. That curing/consolidating operation is generally carried out in an autoclave, that is to say in a large fully closed enclosure with a heating system and a pressurizing system, where the layered structure is bagged and a vacuum is applied to it. In particular, such an autoclave makes it possible to obtain uniform temperature in the layered structure during the curing/consolidating operation. An autoclave is a piece of production equipment with a high cost, and, particularly when it is adapted for making large parts, is a unique resource within a production system, the availability of which determines production management. The price of an autoclave is exponentially proportional with its diameter and with the cost of the door to the inside of the autoclave, which must be sealed when it is subjected to pressure and a large temperature difference between its inner and outer faces. Thus, the more an autoclave is capable of working with large parts at high temperature, the higher its cost. In order to avoid the constraints imposed by the availability and cost of such a piece of equipment, particularly for working with composite materials with organic matrices, methods known as out-of-autoclave methods are used particularly for curing or consolidating parts made of such materials. These out-of-autoclave methods use independently heated molds or molds that can be placed in a stove and means for increasing the pressure inside the mold.

Typically, out-of-autoclave methods for working with a composite material with fiber reinforcement in thermosetting resin are methods that use resin injection, by transfer or infusion, where vacuum is applied to the mold cavity, before the process or otherwise. The most conventional methods initially involve laying up plies of dry fibers, inserted in the closed cavity of a mold, and liquid resin is injected under pressure in said cavity. The mold used for these methods is a rigid closed mold that defines a cavity between two parts, which mold is designed to withstand the pressure inside said cavity and the corresponding closing force. The preform made of dry fibers is located in the cavity between the molding faces of the two rigid parts. That is true, for example of the RTM (Resin Transfer Molding) method.

These out-of-autoclave methods include vacuum-assisted methods such as the LRIVAP or Liquid Resin Injection Vacuum Assisted Process method or the VARTM or Vacuum Assisted Resin Transfer Molding method, which use tooling known as soft tooling, in which a layered structure of dry fibers is laid up on a molding face of said tooling. Said layered structure is bagged and a vacuum is applied to it before the resin is injected.

When these out-of-autoclave methods are used according to the prior art for large parts such as, as non-limitative examples, parts of the wing or fuselage of an aircraft or a wind turbine blade, uniformly heating the cavity of the mold or the matrix in which the layered structure is located is tricky. In the case of a mold with two faces defining a closed cavity, the mass of the mold is large and requires a lot of energy. The use of a mold with a single molding face makes it possible to reduce the mass of the molding device, but only to some extent, because the reduction of thermal inertia becomes a handicap for obtaining uniform temperature. Further, it is difficult to insert a device for heating by fluid circulation or by electrical resistance into a lightweight mold without increasing the sections of the mold. The lack of uniformity of the temperature is also liable to produce distortions in the shape of the mold, in addition to its influence on the flow of resin. Thus, these methods, particularly when used for large parts, are not suitable for application with an independent mold, and are commonly applied in a stove. While such stoves represent a smaller investment than that required for an autoclave, they do however pose the problem of their availability and require heating a fully closed volume that is larger than that made up of the cavity of the mold or the layered structure.

The document EP1 894 442 describes a method for heating a molding surface using inductors inserted in cavities, grooves or bores, machined in a mold. The thickness of the material located between said cavities and the molding surface is used to make the temperature of the molding surface uniform during heating resulting from the circulation of alternating current in said inductors. Thus, this type of tooling, which is satisfactory with medium-sized parts such as the hoods of automotive vehicles, requires a carcass that is relatively massive and turns out to be expensive with very large parts such as those for which the invention is intended.

The document EP 1 728 411/U.S. Pat. No. 7,679,036 describes a device and a method for processing material contained in a cavity, particularly a sealed cavity, comprising two half molds that are electrically conductive placed opposite each other, where the opposite faces of the two half molds which demarcate the cavity are electrically insulated from each other, and are made of magnetic material. The two half molds are surrounded by the coils of an induction circuit. The gap created between the two half molds makes it possible to make induced currents circulate on the faces of the cavity and thus obtain heating focused on those faces without integrating heating means in the half molds such as an electrical resistor, a fluid (vapor or oil) circulation circuit or inductors. In that example of the prior art, the induction circuit is configured in two separable parts, joined to each of the half molds and connected mechanically and electrically when said half molds are brought closer in order to close the cavity. Thus, this device of the prior art is particularly designed to be used in combination with a means to open and close the mold, such as a press.

OBJECT AND SUMMARY OF THE INVENTION

The invention aims to remedy the drawbacks of the prior art and therefore relates to a device for heating a molding face, particularly a large one, which device comprises:
  a. a metal sheet comprising a ferromagnetic layer and comprising a part formed into a shape that defines said molding face and a forming plane;

b. a base and means to support said metal sheet on said base;

c. means for the induction heating of said metal sheet.

Thus, the use of induction heating means makes it possible to achieve the uniform, fast and controlled heating of a fine metal sheet making up the molding face in a method known as an out-of-autoclave method. The invention can be implemented advantageously in the embodiments described below, which may be considered individually or in any technically operative combination.

Advantageously, the base is made of non-metallic material such as concrete or a ceramic. Thus, a rigid base is made in an economical manner, as the mass of said base is not heated.

Advantageously, the metal sheet comprises a ferromagnetic layer made of an alloy comprising iron and nickel, of the INVAR® type (generically known as FeNi36 or 64FeNi in US). Thus, the device according to the invention is particularly suited for processing composite materials with organic matrices, at a temperature close to the Curie temperature of INVAR®, with a coefficient of thermal expansion that is low, such as composites with epoxide matrices and reinforced with continuous carbon fibers.

Advantageously, the metal sheet comprises a ferromagnetic layer made of nickel (Ni). Thus, the device is suitable for materials that require a higher processing temperature, particularly composites with high-performance thermoplastic matrices.

Further, that material is easily processed by additive machining techniques.

In one exemplary embodiment, the device according to the invention comprises:

d. bagging means that demarcate, with the molding face, a sealed cavity adapted to contain a fibrous preform;

e. means to apply vacuum to the volume located between the molding face and the bagging means.

Thus, according to this embodiment, the device according to the invention is suitable for the application of an out-of-autoclave method to a molding face. More particularly, the device according to the invention is suited to the consolidation in shape of a stratified composite part with a thermoplastic matrix and the implementation of methods designed for composites with thermosetting matrices such as the LRIVAP method or the VARTM method.

To that end, the device according to this exemplary embodiment of the invention advantageously comprises:

f. means to inject resin in the cavity demarcated by the molding face.

Advantageously, the device according to the invention comprises:

g. a circuit for the circulation of cooling fluid in contact with the metal sheet.

Thus the forced rapid cooling of the molding sheet, combined with the rapid heating capability of the induction means, reduces the cycle time.

In a particular embodiment, particularly suitable for the curing/consolidation of thick parts, the bagging means comprise a bladder comprising heating means. Thus, the heating applied to the other face of the part makes it possible to reduce the temperature gradients in the thickness of the part during the curing/consolidation cycle.

In a first embodiment of the device according to the invention, the molding face of the metal sheet is ferromagnetic and said device comprises:

h. an enclosure with a volume demarcated by the coils of an induction circuit;

i. means to load, unload and hold the metal sheet and its support inside the coils of the induction circuit.

Thus, the enclosure of the device according to the invention is not necessarily closed and does not need to be thermally insulated. The flow of current in the coils of the induction circuit leads to the direct heating of the molding face of the metal sheet, as a result of the circulation of induced currents on that face, with no transfer of heat by conduction/convection between the air of the enclosure and the mold. The heated volume is extremely small and uniform heating is obtained by controlling the flow of induced currents in it.

In a particular alternative of this first embodiment, bagging is made of electrically insulating material and said device comprises:

j. an electrically insulating shim on the perimeter of the metal sheet;

k. a counterpart made of electrically conductive material and adapted to apply pressure on a preform in the cavity located between the bagging and the molding surface when a vacuum is applied to said cavity, and comprising a face opposite the molding face in order to create a gap between said molding face and the face opposite the counterpart.

Thus, the counterpart creates a gap and further improves the efficiency and control of the heating of the molding surface, particularly by controlling the thickness of the gap. This alternative embodiment makes it possible to use the counterpart as a caul plate, and the insulating shims as packing shims to control thicknesses, and thus reduce the number of parts used in the mold.

Advantageously, the first embodiment of the device according to the invention comprises:

l. walls made of electrically conductive material that extend between a surface of the base and the metal sheet and make up a closed electrical circuit comprising said metal sheet.

Thus, the device is particularly lightweight and the use of electrically conductive walls makes it possible to channel the induced currents in said walls towards the molding surface.

Advantageously, the walls are made of non-magnetic electrically conductive material with low electrical resistivity, such as an aluminum or copper alloy. Thus, because the walls are not magnetic, they are not significantly heated by the circulation of induced currents and they make it possible to concentrate energy for heating the molding surface.

In an exemplary embodiment, the metal sheet is made of non-magnetic electrically conductive material and the molding surface comprises ferromagnetic coating. Thus, said sheet is made of material selected for its formability or machinability properties, independently from its magnetic properties.

In an advantageous embodiment of the first embodiment, the device according to the invention comprises a wall including an extension in the forming plane, the contour of which is configured so that the electrical resistance of the metal sheet measured along the arc on said metal sheet between one end of said extension and the other wall, in a direction parallel to the projection on said sheet of the part of the coils extending parallel to the forming plane and opposite the molding face, is constant over the entire surface of said molding face. Therefore, the length of the path of the induced currents that makes it possible to heat the molding face, and thus the electrical resistance that opposes the circulation of those currents is controlled in order to control the quantity of energy added to the molding face and the uniformity of the temperature. Alternatively, the shape of the contour of the extension of the wall in the forming plane is selected to control the length of the path according to a criterion other than the consistency of that length or that electrical resistance.

In an alternative embodiment of the device according to the invention, the part of the coils of the induction circuit parallel to the forming plane is removable and the other parts of the coils are fixed to the walls and the base. That alternative embodiment where the inductors are joined to the mold makes it possible to make up an independent mold.

In an embodiment of this alternative of the device according to the invention, the removable part of the coils of the induction circuit is connected to the other parts of said coils by means adapted to adjust the distance between said removable part and the molding face. Thus, the adjustment makes it possible to also control the heating of the molding face.

Advantageously, this alternative of the device according to the invention comprises assembly means between the sheet comprising the molding face and the walls so as to allow the replacement of said sheet by another sheet. Thus, the independent tooling according to the invention comprises a fixed part corresponding to the heating and the shapes adapt to that tooling with no need for adapting the heating means to said shapes.

In a second embodiment of the device according to the invention that is compatible with the first embodiment, the metal sheet comprises conduits adapted to receive electrical heating means or channeling the circulation of heat-transfer fluid. This embodiment makes it possible to heat and cool the metal sheet comprising the molding surface. In the embodiment, the electric heating means integrated in the conduits are induction heating means or other means. Said heating means operate alone or in addition to induction heating during the material processing cycle.

In an alternative of that second embodiment, the electric heating means is an inductor and the metal sheet comprises a core made of magnetic material. Thus, the flow of alternating current in the inductor heats the core.

Advantageously, the magnetic core of the metal sheet comprises, on its face opposite the molding face, plating made of material with magnetic properties that are different from those of said ferromagnetic core, wherein the conduits extend along directions that are substantially parallel to the molding face between said magnetic layer and the plating. Depending on its type and magnetic properties, the thickness of the core and the shape of the contact between the plating and said core, the plating makes it possible to modulate the quantity of heating energy added by the inductors. It also makes it easier to make a fine and large metal mold comprising conduits.

Advantageously, the device according to this alternative of the second embodiment of the invention comprises:

m. means to circulate heat-transfer fluid in conduits between the magnetic layer and the plating.

Thus, these cooling means that make it possible to reduce the cycle time use free conduits or conduits also used by the inductors.

In one exemplary embodiment, the plating is made of non-magnetic electrically conductive material. Advantageously, the material is made of copper or aluminum. The use of such material makes it possible to reduce the electrical resistance of the inductive circuit subjected to the inductive currents generated by the inductors, but on the other hand, it reduces the share of energy leading to heating in the total energy added. This alternative embodiment is thus more particularly but not exclusively suited to the making of a very large part where the polymer that makes up the matrix has a low curing or melting point.

In another exemplary embodiment, the plating is made of ferrimagnetic or ferromagnetic material. Advantageously, the plating is made of material comprising a ferrite, and said plating comprises protruding raised features that extend into the molding sheet at the location of the conduits comprising an inductor. These characteristics improve efficiency and make it possible, with the same electrical power, to focus the energy converted into heating in the magnetic layer. Thus, this alternative embodiment is particularly suited to the processing of material with a high melting or curing temperature, particularly the processing of composites with matrices made of high-performance thermoplastic polymer.

Advantageously, the metal sheet comprises thermally conductive coating, which makes up the molding face. That coating makes it possible to rapidly obtain uniform temperature on the molding face.

In another alternative of the second embodiment of the invention, the core (of the metal sheet) is made of light alloy. That alternative embodiment makes it possible to obtain a more lightweight mold and to simplify its designing and handling.

Advantageously, in this second alternative, the electrical heating means is an inductor and the conduits carrying said inductor are made of magnetic material such as steel. Thus, the inductor heats said conduits and the heat is transmitted by conduction to the molding surface, which makes it possible to make the temperature on said molding surface uniform.

Advantageously, the metal sheet in this alternative of the second embodiment of the invention comprises magnetic coating on the molding face.

Thus, said coating is liable to be heated by the inductors located in the conduits or by the external induction circuit.

Advantageously, the metal sheet of the second embodiment of the device according to the invention comprises, on the face opposite the molding face, plating made of soft material adapted to close one of the faces of a conduit for the circulation of heat-transfer fluid. This embodiment makes it easier to make conduits and ensure that they are sealed.

Advantageously, the conduit designed for the circulation of heat-transfer fluid in the device according to the invention comprises means adapted to favor a turbulent flow regime of said heat-transfer fluid. Thus that turbulent regime favors heat exchange by convection with the walls of said conduit.

The invention also relates to a method for the manufacturing of a device according to the invention, wherein the metal sheet is obtained by a manufacturing method comprising an additive machining operation.

In one exemplary embodiment of the method according to the invention, the metal sheet is made of nickel and is obtained using an NVD technique. In another method for manufacturing the device according to the invention, the metal sheet is obtained by means of a method that comprises a step of molding a light alloy in a mold comprising steel tubes.

BRIEF DESCRIPTION OF THE DRAWINGS

The invention is described below in its preferred embodiments, which are not limitative in any way, and by reference to FIGS. 1 to 10, wherein:

FIG. 6 is a partial perspective view of the sheet and the walls of the tooling of the device according to the invention in a particular embodiment of said tooling;

FIG. 7A represents a front view along the section BB defined in FIG. 7B of an exemplary embodiment of the device according to the invention in which inductors are integrated in conduits made between the sheet bearing the molding surface and plating;

FIG. 7B illustrates an embodiment of the device according to the invention represented in FIG. 7A in a top view along the section CC defined in FIG. 7A, in which a detail shows a turbulator in a conduit for the circulation of fluid;

DETAILED DESCRIPTION OF THE EMBODIMENTS

In order to make representations simpler, the device according to the invention is represented without the fibrous preform and without the bagging means, except when such components are indispensable for understanding, as those components are fully known from the prior art.

Figure 1:
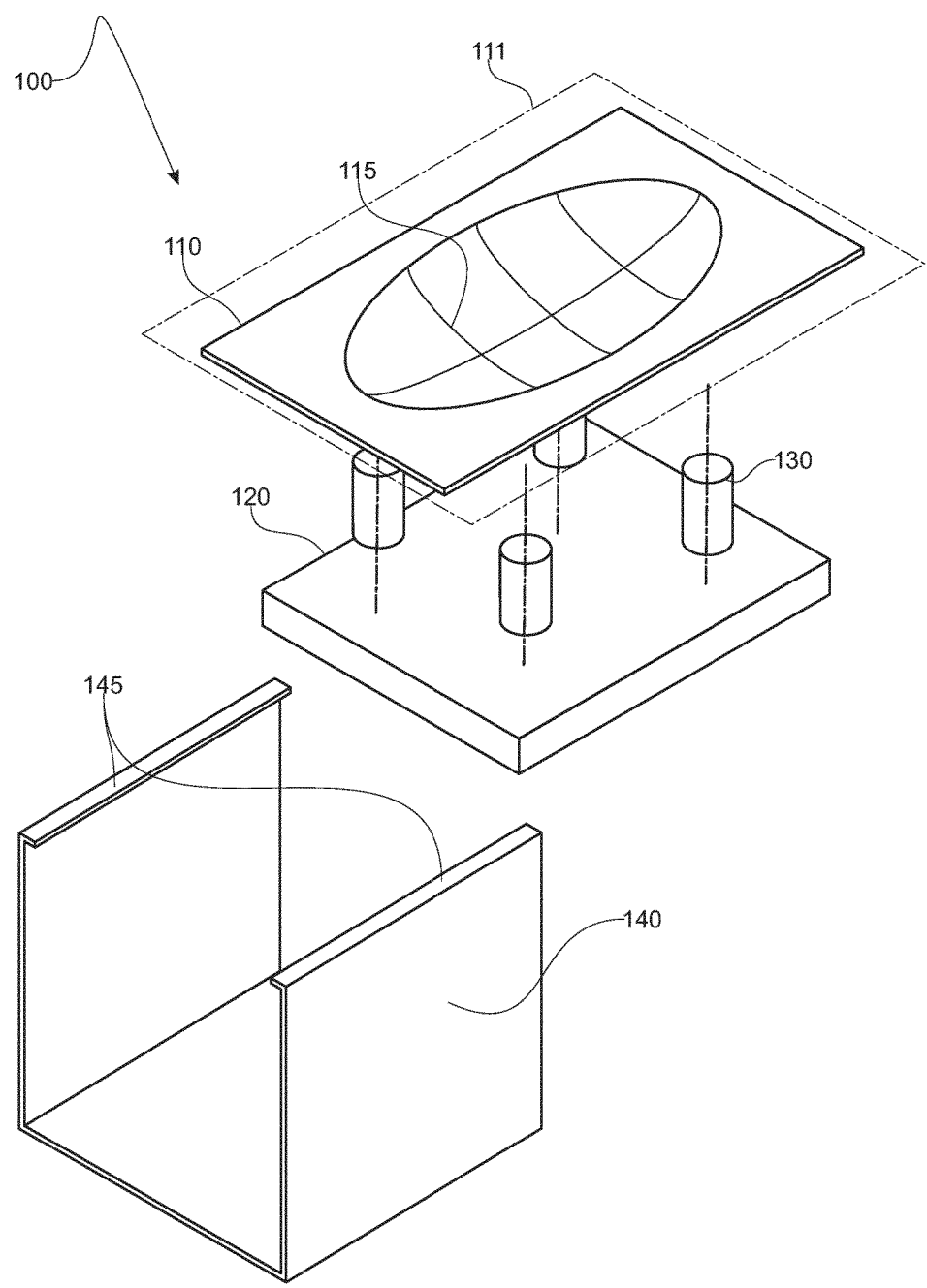
FIG. 1 is a perspective exploded view of an exemplary embodiment of the tooling of the device according to the invention.

In FIG. 1 of an exemplary embodiment, the tooling of the device according to the invention comprises a formed metal sheet (110) comprising a molding surface (115). In this exemplary embodiment, the molding surface (115) is hollowed in relation to a virtual plane (111), known as the forming plane, tangent to the flat face of said sheet (110). In one exemplary embodiment, that sheet is made of a magnetic alloy of iron (Fe) and nickel (Ni) comprising for example 36% nickel, marketed under the name INVAR® because of its low coefficient of expansion.

The molding face (115) of said metal sheet (110) is, in one exemplary embodiment, designed to receive a fibrous preform made of dry fibers or fibers prepregged with thermoplastic polymer.

The term 'dry fibers' refers to a layered structure of prepreg fibers with no more than 5% raw thermosetting resin. The term 'prepreg fibers' in relation to prepregging with thermoplastic polymer refers to a layered structure of fibrous plies calendered with thermoplastic film, powdered with thermoplastic polymer or mixed along with thermoplastic fibers.

Thus, the use of INVAR® for making the metal sheet makes it possible to adapt the coefficient of expansion of the molding face to the expansion of the carbon fibers. Alternatively, when for example the fibrous plies of the preform are made of fiberglass or metal fibers, the metal sheet (110) is made of low carbon steel or steel comprising ferromagnetic silicon. In yet another embodiment, the sheet (110) is made of nickel. Depending on its composition, the required manufacturing precision and the complexity of the molding face, said sheet is formed by a forming method such as:

stamping, drawing, incremental forming, electroforming or with the help of a machining method involving the removal of material or an additive machining method such as the nickel vapor deposition method (known as NVD), the laser powder fritting method or a melted powder spraying method or finally using a combination of those methods. As a non-limitative example, the document WO 2013/079725 describes an example of the combination of such methods for making a part.

In another embodiment, the sheet (110) comprising the molding surface (115) is made of electrically conductive metal material, for example a copper alloy or an aluminum alloy and the molding surface is coated with coating that is from a few tenths of a millimeter to a few millimeters thick, of magnetic material, for example nickel.

In this exemplary embodiment of the tooling of the device according to the invention, the metal sheet (110) comprising the molding surface (115) is joined to a base (120) by joining elements (130). The sections, number and position of said base and joining elements are determined in respect of the support elements (130), so as to make the sheet (110) comprising the molding face (115) rigid. As non-limitative examples, the base (120) and the support studs (130) are made of concrete without metal reinforcement, silicates, zirconia or alumina, so as to make rigid elements with a low coefficient of thermal expansion, for a lower cost.

The tooling comprises walls (140) made of electrically conductive material with low electrical resistivity. Said walls (140) extend between the base (120) and the sheet (110) comprising the molding surface, with which they are in electrical contact so that the walls (140) and the sheet (110) make up a closed electrical circuit. For example, the walls (140) are made of copper.

Advantageously, said walls (140) comprise, at their joints with the sheet (110), extensions (145) that extend in the forming plane (111).

Figure 2:
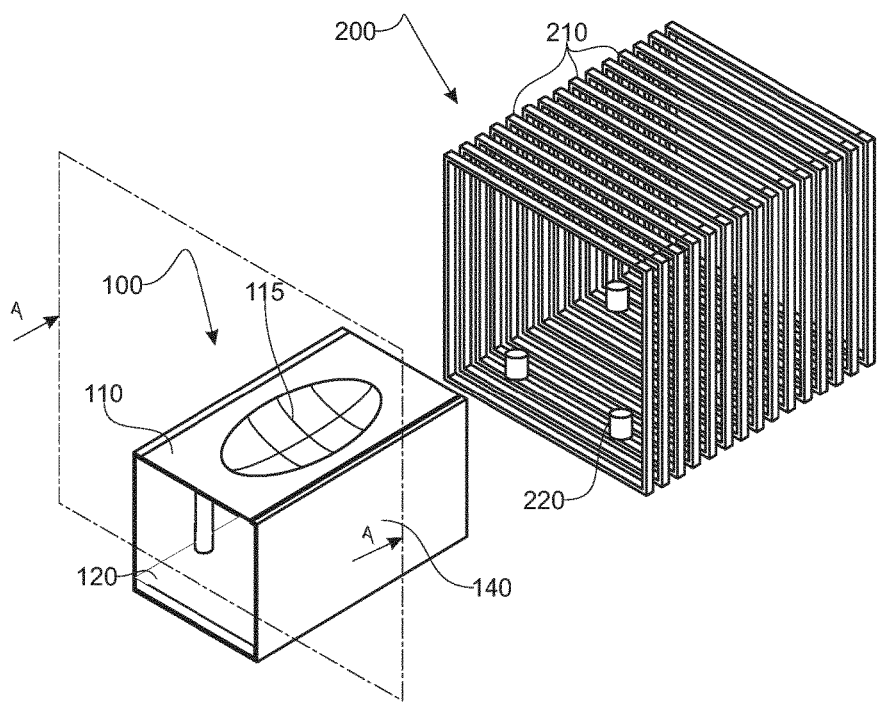
FIG. 2 is an illustration of a perspective view of an embodiment of the device according to the invention, in which the tooling is inserted in an enclosure.

In FIG. 2 of a first alternative of the device according to the invention, the tooling (100) cooperates with an enclosure (200) made up of the coils (210) of an induction circuit. Said tooling (100) is placed in said enclosure (200) on positioning means (220), for example insulating studs, for positioning the tooling at the center of said enclosure (200). The induction circuit is connected to a generator (not shown) adapted to generate alternating electrical current with frequency between 10 kHz and 100 kHz and making it circulate in said coils (210).

Figure 3:
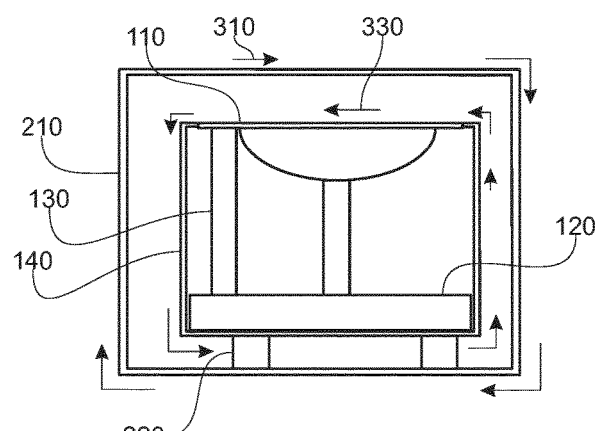
FIG. 3 is an end view of the device according to the invention in the embodiment of FIG. 2, in which the tooling is placed in the enclosure.

Thus, in FIG. 3, when the electrical current (310) flows in the coils (210) of the induction circuit, eddy currents (330) are induced and flow in the walls (140) of the tooling and in the sheet (110) comprising the molding surface (115).

Said currents flow in a fine thickness, from a few tenths of a millimeter to a few millimeters, in a layer on the outer faces of the tooling that are opposite the coils (210). In the walls (140), which are made of electrically conductive material with low electrical resistivity, that flow of induced currents (330) produces negligible heating and consumes little energy. On the other hand, in the sheet (110), which is made of electrically conductive and magnetic material, the flow of these currents at a high frequency leads to induction heating. Thus, most of the heating energy is focused on the molding surface.

Figure 4:
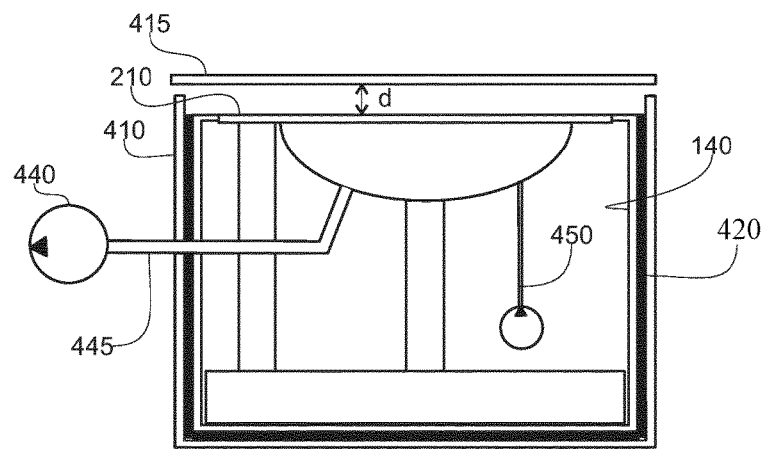
FIG. 4 illustrates an end view of another alternative of the device according to the invention, in which the induction circuit is joined to the walls of the tooling.

In FIG. 4 of another exemplary embodiment of the device according to the invention, the coils (410) are fixed to the walls (140) of the tooling with the exception of a removable part (415) of said coils, substantially parallel to the forming plane. A layer (420) of electrically insulating material is placed between the walls and the conductors that make up the coils (410) of the induction circuit; alternatively, the coils themselves may have insulating coating. Thus, tooling with independent heating is created.

By removing the removable part (415) of the coils (410), the access to the molding surface of the sheet (110) is revealed, making it possible to install a fibrous preform and all the devices for bagging said preform on the molding shape according to techniques known in the prior art. Thus, in one exemplary embodiment, the cavity formed by the molding surface is connected via an appropriate conduit (445) to a vacuum pump (440) that makes it possible, after bagging, to apply vacuum to the preform, and means (450) for injecting liquid resin in the preform and thus use out-of-autoclave methods of the VARTM or LRIVAP type. In one exemplary implementation, after the fibrous preform is put in place on the molding surface, the whole is bagged to make it tight. The removable part (415) of the coils is installed so as to close said coils. A vacuum is applied to the preform. The induction circuit is supplied with alternating current, which results in the heating of the fibrous preform. The resin is then injected or infused in the fibrous preform and heating is maintained for the time required to cure said resin.

The power supply of the induction means is modulated so as to modify the heating temperature between injection and curing.

In one particular embodiment, the connection device between the removable part (415) of the coils (410) and said coils comprises means to adjust the distance (d) between said removable part and the sheet (210) bearing the molding surface.

Figure 5:
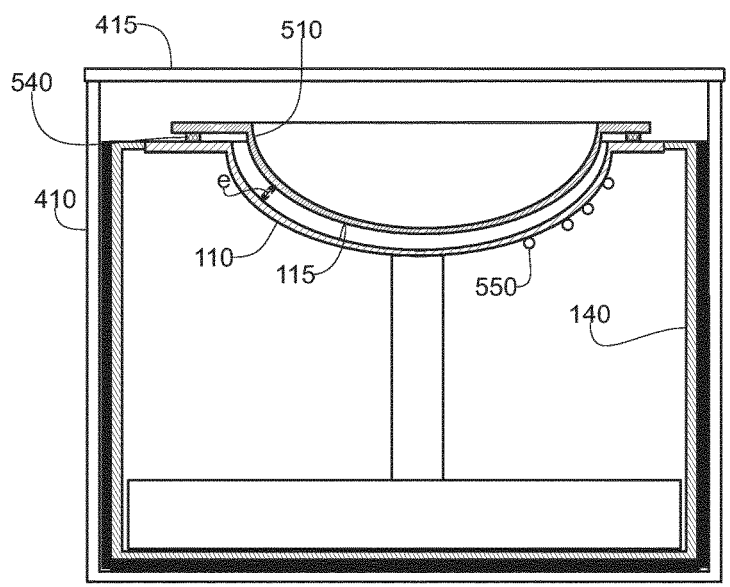
FIG. 5 is a view along the section AA defined in FIG. 2 of an exemplary embodiment of the device according to the invention using a counterpart.

In FIG. 5 of another exemplary embodiment, the device according to the invention uses a counterpart (510) with a profile that is complementary to the molding surface (115) and electrically insulated from the conductive sheet (110), for example using insulating shims (540). Said counterpart (510) is advantageously made of electrically conductive but non-magnetic material, such as an aluminum alloy.

Thus, the cavity demarcated between the counterpart (510) and the molding surface, cavity containing the fibrous preform and the bagging means, is characterized by a gap (e) separating the molding surface (115) and the counterpart (510), wherein said gap is constant or variable along said cavity depending on the embodiment. When the coils (410) of the induction circuit are supplied with high-frequency alternating current, eddy currents flow on the surfaces demarcating the cavity, that is to say the molding surface (115) and the surface opposite the counterpart (510). That technical effect is advantageously used depending on the different configurations. Thus, if the counterpart (510) is made of magnetic electrically conductive material, that circulation of induced currents heats the surface of the counterpart (510), making it possible to heat the preform on both its sides. If the counterpart (510) is made of non-magnetic electrically conductive material, said counterpart is not significantly heated, but the distance of the gap makes it possible to modify the quantity of induced currents on the molding surface. Thus, said counterpart (510) makes it possible to both increase the energy efficiency of heating and also to control the distribution of induced currents in the molding surface and thus the temperature distribution. The adapted shape of the counterpart (510) in respect of the molding surface is determined by numerical simulation or using a successive experimental approach.

In one particular embodiment, the counterpart (510) is used as a caul plate. This embodiment is particularly advantageous when the device according to the invention is used for consolidating prepreg plies of thermoplastic polymer. In this example, the shims (540) act as packing shims that calibrate the minimum thickness of the thickness and avoid resin squeezing phenomena between plies. Advantageously, a cooling circuit (550) is fixed on the face opposite the molding face of the metal sheet (110). In this embodiment, said cooling circuit is made up of conduits carrying heat-transfer fluid, such as air, nitrogen or water, which conduits are welded to the sheet. Alternatively, if the sheet is obtained using an additive machining method, said conduits (550) are made with the material of the sheet (110) during that machining operation.

In FIG. 6 of an exemplary embodiment, the contour (640) of the extensions (145) of the walls (140) of the tooling in the forming plane is configured so as to control the length of the path (631, 632) of the induced currents between the walls. Thus, in one exemplary embodiment, said contour is configured so that the electrically resistive length of the path is constant over the entire area of the molding face (115). Other contour shapes (640) allow other controls, and thus, a three-dimensional path (631, 632) can be controlled from a two-dimensional contour (640).

In an advantageous exemplary embodiment, the sheet (110) bearing the molding face (115) is assembled onto the walls (140) using appropriate means (660) so as to be removable. Said sheet (110) is supported by support means on the rigid base, and so that assembly with the walls (140) is essentially aimed at providing electrical continuity between said sheet (110) and said walls (140). Thus, the assembly is advantageously made to support the difference of expansion between the sheet (110) and the walls (140), for example when said sheet is made of INVAR® and the walls (140) are made of copper, without the difference in expansion leading to stress or distortion in the tooling. Thus, a single tooling base, comprising independent heating means, can be used for a variety of shapes.

In FIG. 7A of another embodiment of the device according to the invention that is compatible with the previous embodiments, the sheet (700) bearing the molding face comprises a ferromagnetic core (710) comprising the molding face and, set against the opposite face of said core (710), a layer (720) of plating made of material with magnetic behavior that is different from that of the material making up the ferromagnetic core (710). Thus, as a non-limitative example, the core (710) is made of nickel and the plating (720) is made of copper.

Conduits (751, 752) extending over the length of the molding face, and in respect of the section, between the ferromagnetic core (710) and the plating (720), are used in this exemplary embodiment to insert an induction circuit and for the circulation of heat-transfer fluid. In this exemplary embodiment, the conduits (752) designed for carrying the heat-transfer fluid extend parallel to the conduits (751) comprising the induction circuit. In an alternative embodiment (not shown), the two types of conduit extend along secant directions. In this last embodiment, the two types of conduits extend in different altitudes along the section of the sheet (700). More particularly, when the heat-transfer fluid is gaseous, all or part of the conduits (752) designed to carry said fluid comprise means to favor a turbulent flow in the fluid in said conduits. As an example, said means are made up of a turbulator (756) in the form of a twisted rod placed at the center of the conduit, extending over all or part of the length of said conduit.

In FIG. 7B, the induction circuit comprises one or more inductors (760). Said inductor is preferably made up of a conducting cable with multiple strands that are not individually insulated, which makes it sufficiently flexible to follow the contour of said conduits along the complex shape of the molding face. In this exemplary embodiment, the cooling conduits (752) are made directly while manufacturing the sheet (700), for example using an additive machining method. Also in that exemplary embodiment, the device according to the invention comprises two cooling circuits, each comprising an inlet (753) and an outlet (754) for the heat-transfer fluid. The connection between the cooling conduits (752) is made via hoses (755) outside the metal sheet (700).

In FIG. 7A of this exemplary embodiment, the ferromagnetic core (710) is covered with coating (730) with high conductivity and advantageously, high thermal effusivity. Thus, that coating favors the uniformity of temperature on the molding face during heating, and favors thermal exchange with the preform used in the device according to the invention. In different exemplary embodiments, said coating (730) is made of copper or a copper alloy, aluminum or an aluminum alloy, or graphite.

Figure 8:
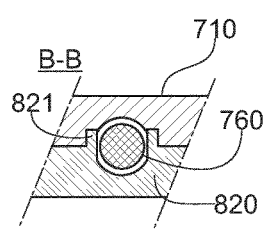
FIG. 8 illustrates a view along the section BB defined in FIG. 7B of an exemplary embodiment of the device according to the invention, in which the plating comprises relief features extending in conduits receiving an inductor.

In FIG. 8 of an alternative of the embodiment illustrated in FIG. 7, the plating (820) is made of ferrimagnetic material and has protruding relief features (821) that extend in the ferromagnetic core (710) perpendicular to the conduits comprising an inductor (760). Said plating is for example made of ferrite deposited, for example, by laser fritting or by plasma spraying on the back of said ferromagnetic core (710). Alternatively, said plating (820) is obtained using an enameling technique, wherein the enamel coat comprises suitable ferrite particles, or by depositing a composite containing such particles.

A ferrite is an oxide of the $Fe_xO_yA_zB_n$ type, where A and B are metals, for example Ni, Mn, Zn. The nature of the ferrite and the height of the relief features (821) are determined depending on the frequency of the current supplied to the inductor (760) so as to focus the flow of induced currents in the ferromagnetic core (710) and improve heating efficiency with the same electrical power.

Figure 9:
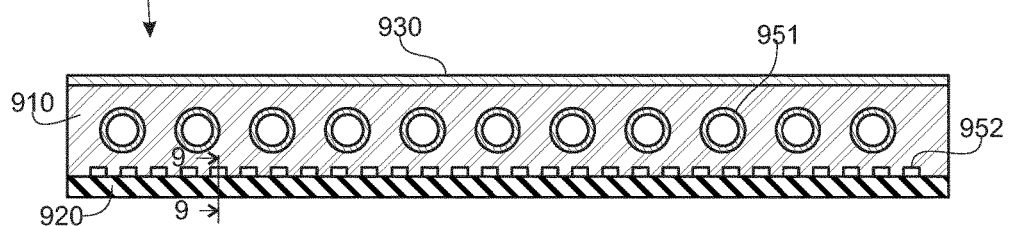
FIG. 9 is a view along a section CC of an embodiment of the metal sheet of the device according to the invention, in which said sheet is represented flat for the purpose of simplification, and also shows a detailed view of a cooling channel along the section 9-9 defined in that same view.

In FIG. 9 of another exemplary embodiment of the device according to the invention, the metal sheet (900) of the device according to the invention comprises a core (910) made of light cast alloy, which core is made by gravity casting said alloy in a mold comprising steel tubes (951) in which the inductors are subsequently installed. As a non-limitative example, said light alloy is an aluminum or magnesium alloy. In one alternative embodiment, said tubes (951) are made of ferromagnetic steel or have ferromagnetic coating. Thus, when alternating current flows through the inductors, the tubes are heated and transmit their heat by conduction to the light alloy core (910), and the heat is propagated up to the molding surface.

Even if this exemplary embodiment is represented with a flat molding surface, those skilled in the art can easily adapt the embodiment to any molding surface; however, this embodiment is better suited to a molding surface with a single or double curvature, where one of the curvatures is not pronounced.

In one exemplary embodiment, not limited to this mode of implementation, the cooling channels (952) are obtained by making grooves in the face opposite the molding surface of the core of the metal sheet. In order to make sealing easier, cooling is carried out by gaseous heat-transfer fluid, for example air. Thus, unlike cooling with a liquid heat-transfer fluid, a small leak of said heat-transfer fluid has no effect on the operating safety of the device. In this exemplary embodiment, the grooves are closed by soft coating (920), for example made of fluorinated silicone to withstand temperature. Said soft coating (920) is represented here as extending over the entire surface of the metal sheet. In alternative embodiments, the channels (952) are sealed by discontinuous soft coating (not shown), wherein each segment of said coating extends along the width, one for several channels.

In this exemplary embodiment, detail 9-9, one of the faces of the grooves creating the channels has a profile (953) adapted to favor the turbulent flow of fluid in said channels so as to favor exchange by convection between the heat-transfer fluid and the metal sheet.

Figure 10:
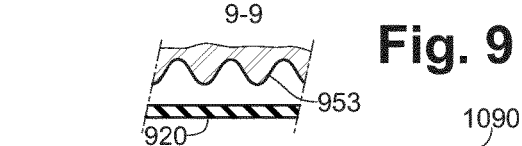
FIG. 10 is a view along a section CC represented along a flat molding face to make it easier to represent, of an exemplary fibrous preform processed by the device according to the invention associated with a heating bladder.
Figure 10:
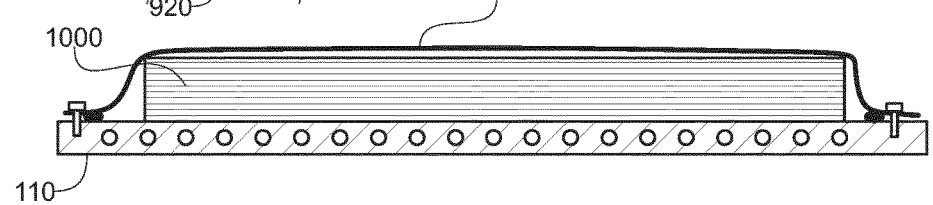

In FIG. 10 of an exemplary embodiment particularly suited to the curing/consolidation of a thick fibrous preform (1000), the device according to the invention uses bagging means comprising a heating bladder (1090). In one embodiment, such a heating bladder is made of silicone and has a fine metal wire mesh that can provide heating by electrical resistance. That additional heating makes it possible to achieve uniform temperature in the thickness of the preform (1000).

The description above and the exemplary embodiments show that the invention achieves its objectives; in particular, it allows the application of processing methods such as curing and consolidation of large composite parts without using an autoclave or a stove and with energy savings. In comparison with devices of the prior art, the device according to the invention allows the use of lightweight means adaptable to different configurations.

The invention claimed is:

1. A heating device to heat a molding face, comprising a metal sheet comprising a ferromagnetic layer and a part formed into a shape that defines the molding face and a forming plane; a base; support studs to support the metal sheet on the base; and an induction circuit providing an induction heating of said metal sheet.

2. The heating device according to claim 1, wherein the base is made of a non-metallic and non-electrically conductive material, the material being either concrete or ceramic.

3. The heating device according to claim 1, wherein the metal sheet comprises a ferromagnetic layer made of an alloy of a FeNi36 type comprising iron and nickel.

4. The heating device according to claim 1, wherein the metal sheet comprises a ferromagnetic layer made of nickel.

5. The heating device according to claim 1, further comprising a bagging to demarcate, with the molding face, a sealed cavity configured to contain a fibrous preform; and a vacuum pump and a conduit to apply a vacuum to a volume located between the molding face and the bagging.

6. The heating device according to claim 5, further comprising an injector to inject a resin in the sealed cavity demarcated by the molding face.

7. The heating device according to claim 1, further comprising a circuit to circulate a cooling fluid in contact with the metal sheet.

8. The heating device according to claim 5, wherein the bagging comprises a bladder comprising a heater.

9. The heating device according to claim 5, wherein the molding face of the metal sheet is ferromagnetic; and the heating device further comprises an enclosure with its volume demarcated by coils of the induction circuit; and an insulating studs to load, unload and hold the metal sheet, the base and the support studs inside the coils of the induction circuit.

10. The heating device according to claim 9, wherein the bagging is made of electrically insulating material; and the heating device further comprises:
an electrically insulating shim on a perimeter of the metal sheet; and
a counterpart made of an electrically conductive material and configured to apply pressure on the fibrous preform in the sealed cavity located between the bagging and the molding surface in response to the vacuum applied to the sealed cavity, the counterpart comprises a face opposite the molding face to create a gap between the molding face and the face of the counterpart.

11. The heating device according to claim 10, further comprising walls made of an electrically conductive material extending between a surface of the base and the metal sheet, and the walls form a closed electrical circuit comprising the metal sheet.

12. The heating device according to claim 11, wherein the walls are made of an aluminum or copper alloy, or a non-magnetic electrically conductive material with a comparable low electrical resistivity as the aluminum or copper alloy.

13. The heating device according to claim 9, wherein the metal sheet is made of a non-magnetic electrically conductive material and the molding surface comprises a ferromagnetic coating.

14. The heating device according to claim 12, wherein a first wall comprises an extension in the forming plane, a contour of the extension is configured so that an electrical resistance of the metal sheet measured along an arc on the metal sheet between one end of the extension and a second wall, in a direction parallel to a projection on the metal sheet of a part of the coils of the induction circuit extending parallel to the forming plane and opposite the molding face, is constant over an entire surface of the molding face.

15. The heating device according to claim 11, wherein a part of the coils of the induction circuit parallel to the forming plane is removable and other parts of the coils of the induction circuit are fixed to the walls and the base.

16. The heating device according to claim 15, wherein the removable part of the coils of the induction circuit is connected to the other parts of the coils of the induction circuit by a connector configured to adjust a distance between the removable part and the molding face.

17. The heating device according to claim 15, comprising an assembly between the metal sheet comprising the molding face and the walls to allow a replacement of the metal sheet by another metal sheet.

18. The heating device according to claim 1, wherein the metal sheet comprises at least one conduit configured to receive an electrical heater or to channel circulation of a heat-transfer fluid.

19. The heating device according to claim 18, wherein the electric heater is an inductor; and wherein the metal sheet comprises a core made of a magnetic material.

20. The heating device according to claim 19, wherein the magnetic core of the metal sheet comprises, on its face opposite the molding face, a plating made of material with magnetic properties that are different from that of the magnetic core; and further comprising conduits extend along directions that are substantially parallel to the molding face between the magnetic core and the plating.

21. The heating device according to claim 20, further hoses to connect inlets and outlets of the conduits to circulate the heat-transfer fluid in the conduits between the magnetic core and the and the plating.

22. The heating device according to claim 19, wherein the magnetic core of the metal sheet comprises, on its face opposite the molding face, a plating made of a non-magnetic electrically conductive material; and wherein the conduits extend along directions that are substantially parallel to the molding face between the magnetic core and the plating.

23. The heating device according to claim 20, wherein the plating is made of a ferrimagnetic or ferromagnetic material.

24. The heating device according to claim 23, wherein the plating comprises protruding raised features that extend into the magnetic core at a location of the conduits housing the inductor.

25. The heating device according to claim 23, wherein the plating is made of a material comprising a ferrite.

26. The heating device according to claim 19, wherein the metal sheet comprises a thermally conductive coating on the molding face.

27. The heating device according to claim 18, wherein the magnetic core of the metal sheet is made of a light alloy.

28. The heating device according to claim 27, wherein the electrical heater is an inductor and the conduits carrying the inductor are made of a steel or a magnetic material.

29. The heating device according to claim 28, wherein the metal sheet comprises a ferromagnetic coating on the molding face.

30. The heating device according to claim 18, further comprising, on a face opposite the molding face, a plating made of a material configured to close one face of said at least one conduit circulating the heat-transfer fluid.

31. The heating device according to claim 18, wherein said at least one conduit circulating the heat-transfer fluid comprises a turbulator to generate a turbulent flow of the heat-transfer fluid.

32. A method of manufacturing the heating device according to claim 1, wherein the metal sheet is produced by a manufacturing process comprising an additive machining operation.

33. The method according to claim 32, wherein the metal sheet comprises a core made of nickel and the core is produced using an NVD technique.

34. A method of manufacturing of the heating device according to claim 1, wherein the metal sheet is produced by a manufacturing process comprising a step of molding a light alloy in a mold, the mold comprising steel tubes.

* * * * *